Jan. 5, 1965  A. A. GOLDBERG ETAL  3,164,762

REMOTE CONTROL APPARATUS

Filed March 18, 1960  2 Sheets—Sheet 1

INVENTOR.
ABRAHAM A. GOLDBERG
BY ARTHUR KAISER

Amster & Levy
ATTORNEYS

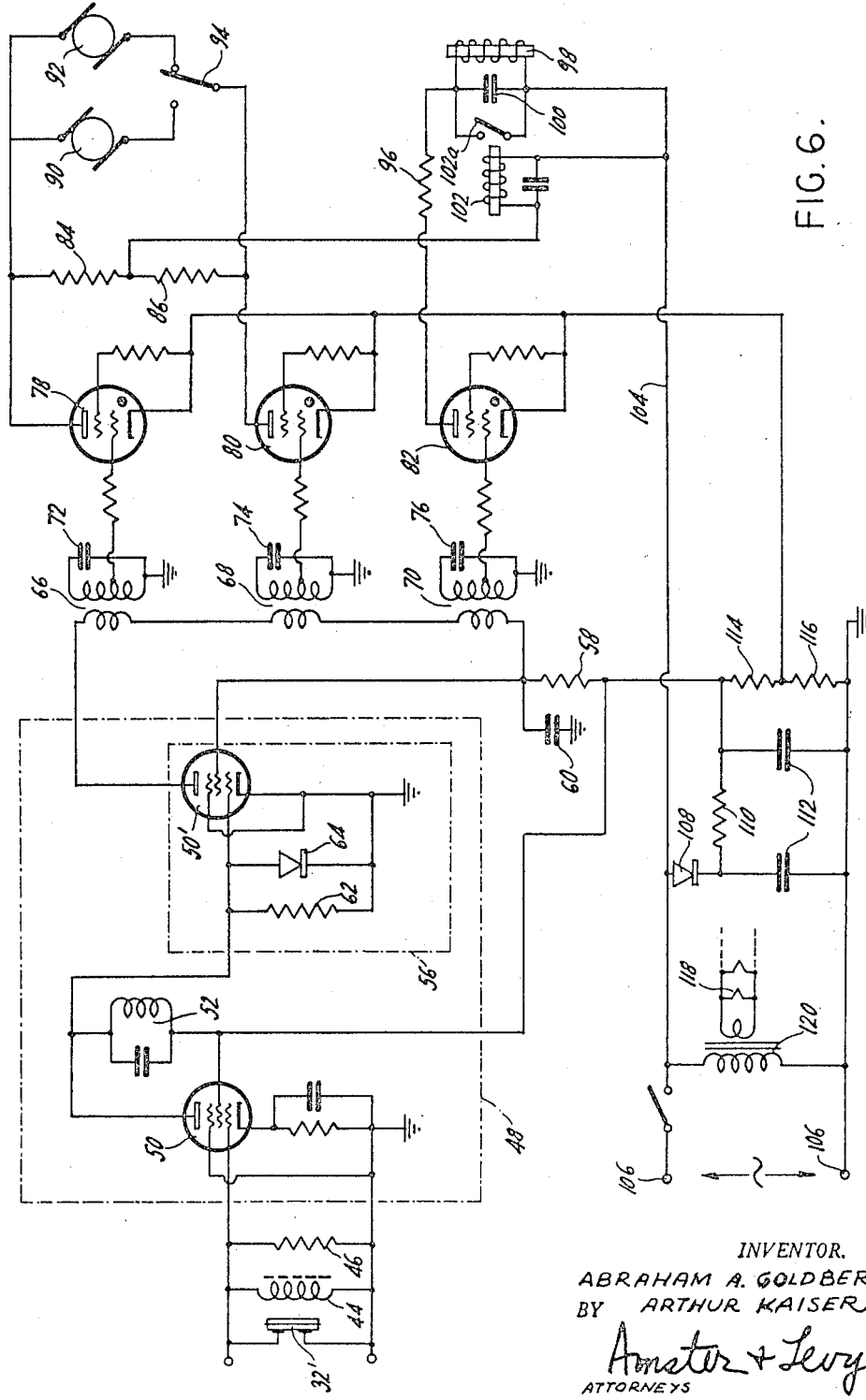

United States Patent Office 3,164,762
Patented Jan. 5, 1965

3,164,762
REMOTE CONTROL APPARATUS
Abraham A. Goldberg, Stamford, and Arthur Kaiser, Trumbull, Conn., assignors to Columbia Broadcasting System, Inc., New York, N.Y., a corporation of New York
Filed Mar. 18, 1960, Ser. No. 16,096
6 Claims. (Cl. 318—460)

The present invention relates to electrical remote-control apparatus, and more specifically this invention relates to apparatus for selectively controlling multiple functions from a remote control point as, for example, in the control of a phonograph from a listening position.

An object of this invention resides in the provision of a novel remote-control system having an unusually high degree of immunity to ambient disturbances.

A further object resides in the provision of a novel remote-control system including means for selectively effecting a number of desired control functions. A more specific object is to provide novel apparatus for effecting continuously variable adjustment by remote control, and to effect such adjustment in either of two opposite directions.

Further objects reside in a number of novel features in a remote control receiver which contribute to rejection of spurious signals; which provide sharp selectivity among the various transmitted control signals; and which are sharply selective at ample response level without producing receiver instability.

Additional novel features relate to prevention of spurious operation of the controls in the remote-control receiver during temporary warm-up conditions, in effect just after the receiver has been turned on; and a further novel feature resides in preventing operation of the remote-control receiver in response to broad-band signals of inordinate power which might otherwise have the control effect of true control signals.

The illustrative embodiment of the invention in its various aspects includes a self-contained, compact and readily portable transmitter, and a remote-control receiver positioned at the controlled apparatus. The controls of the receiver include a solenoid, used in this embodiment of the invention for "reject" operation of a controlled phonograph; and the controls also include a reversible motor for continuous variable control functions, utilizing two different control channels for the respective directions of motor operation.

The controlled apparatus functions in response to only one control signal at a time. If strong spurious signals were received in both motor channels, there would be no response; and if the same signal were to get through to the solenoid control circuit it would be ineffectual because of the inclusion of an operation suppressing relay in the solenoid circuit, controlled by the motor channels.

The receiver operates the three different control circuits by high-level signals in its selective channels. A high-gain band-pass amplifier converts the received signals to the required high-level control signals. The existence of high-level signals in a high-gain amplifier having a sharply selective channel would ordinarily require special precautions to guard against instability. The need for such precautions is here minimized by applying the output of the band-pass amplifier to a harmonic generator having in its output a series of sharply selective circuits each tuned to a harmonic of a respective transmitted control signal. Any feedback of the harmonic output signal to the band-pass amplifier has little, if any, tendency to cause instability.

In the illustrative receiver, the control channels include tubes having thermionic cathodes, thyratrons to be specific. As they warm up, there might be a tendency for a thyratron to fire. This possibility is precluded by using a solid-state rectifier in a circuit that provides thyratron hold-off bias which, therefore, is instantly available at full value during the warm-up interval.

The remote-control system includes a self-contained, portable, transistorized transmitter having selectively operable control-signal generators and a band-pass output end. This includes an impedance-loaded band-pass ultrasonic transducer, and the receiver has a like transducer, similarly loaded for band-pass performance. The highly selective input end of the receiver is immune to electrical disturbances which might prove troublesome were radio frequency transmission used instead of the ultrasonic signals. It will be appreciated, however, that certain aspects of the invention apply to both radio and ultrasonic transmission between the control transmitter and receiver.

The nature of the invention will be more fully appreciated, and various additional features of novelty and objects will be apparent from the following detailed description of an illustrative embodiment of the invention in its various aspects. This illustrative embodiment is shown in the accompanying drawing forming part of this disclosure. In the accompanying drawings:

FIG. 6 is the wiring diagram of the receiver forming part of the illustrative remote-control system.

Figure 1:
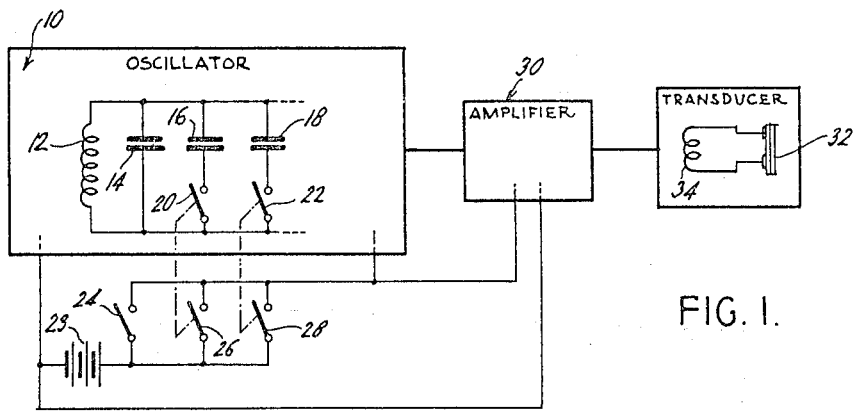
FIG. 1 is essentially a block diagram representing the transmitting portion of the novel remote control system.

The illustrative remote-control system in the drawings is designed for the purpose of accomplishing continuously variable control of both volume and stereo balance of a stereophonic record-player, and to accomplish the "reject" function for changing records automatically by remote control. In the case of the continuously variable control, the capacity to operate in either one direction or the opposite is important. Direction control is useful both to increase the volume and to decrease the volume of a phonograph under remote-control; and direction control over the continuously variable function is also useful for adjusting the relative levels of output from two laterally-spaced speakers in a stereo system. These are the remote control functions accomplished in the illustrative apparatus to be described. However, it is within the contemplation of the present invention to substitute or add other comparable functions, depending upon the particular application of the invention in its various aspects. Thus, rather than to adjust a volume control for either increased or decreased output, it may be desired to proportionally rotate a tuning knob in a radio receiver, or it may be desired to index the tuner of a television receiver in one-step increments. Adaptation of the disclosed apparatus to these and additional remote-control functions will be readily accomplished by those skilled in the art.

An illustrative remote-control transmitter is shown in FIG. 1. It includes two controls for selectively operating a motor by remote control in either of two directions, and a third control for the remote "reject" solenoid of an automatic phonograph. The transmitter includes an oscillator 10 which has a coil 12 shunted by tuning condenser 14. Coil 12 and condenser 14 are tuned to the highest of three desired control frequencies. Two additional tuning condensers 16 and 18 are provided, which may be selectively connected in parallel with condenser 14 by closing either switch 20 or switch 22. A battery 23 forms part of the completely portable remote-control transmitter, and it has three off-on sets of contacts 24, 26 and 28. Contacts 26 are mechanically coupled to switch 20 for concurrent operation, and contacts 28 are likewise coupled to switch 22 for concurrent operation, advantageously in the form of multiple-contact push-buttons. Condenser 16 is chosen so as to reduce the oscillator frequency to the center of three control frequencies; and condenser 18, when connected in parallel with condenser 14, reduces the control frequency to the lowest of the three control frequencies. In the illustrative embodiment, ultrasonic frequencies are used of 38, 40 and 42 kilocycles/sec.

The output of oscillator 10 is applied to an amplifier 30 which, in turn, excites transducer 32 shunted by a loading coil 34 for imparting a desired broad-band characteristic to the transducer.

When the switch 24 is closed, the battery power is applied to the oscillator 10 and amplifier 30, these being suitably transistorized, and a control tone of 42 kilocycles is propagated by transducer 32. Closing of switches 20 and 26 causes propagation of a 40-kilocycle control signal; and closing of switches 22 and 28 similarly causes transmission of a 38-kilocycle signal. The system thus provides assurance that only one control signal at a time can be transmitted. Use of ultrasonic transmission between the transmitter and the receiver has the advantage (noted above) of virtually complete immunity of the system to radio frequency signals and "noise," and to locally produced electrical disturbances in the power-line of the system. The receiver, designed for ultrasonic reception, is naturally not sensitive to radio or electrical interference. The receiver, as will be seen, is also of a form to be virtually immune to ambient spurious sound energy.

Figure 2:
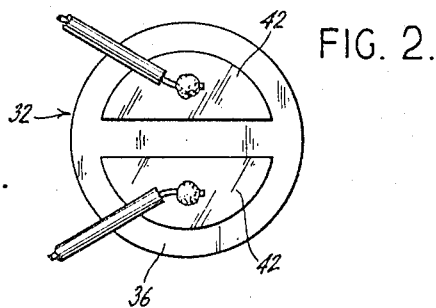
FIG. 2 is the plan view, drawn to enlarged scale, of an ultrasonic transducer forming an element in both the transmitter and the receiver of the illustrative remote control system.
Figure 3:
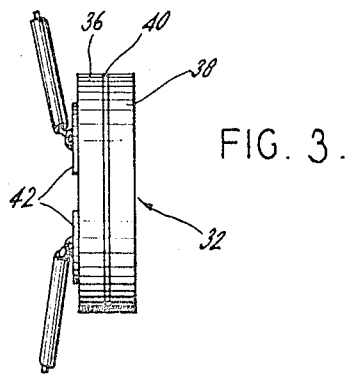
FIG. 3 is a side elevation of the transducer shown in FIG. 2.

A particularly effective ultrasonic transducer for the transmitter of FIG. 1 is illustrated in FIGS. 2 and 3. In those figures, a barium titanate disc 36 is shown bonded to an aluminum disc 38 by an epoxy coat 40. A pair of silver-film electrodes 42 are shown on barium titanate disc 36. In a transducer proportioned to operate in the 38, 40 and 42 kilocycle range, an example of the transducer of FIGS. 2 and 3 has been made of 0.875 inch diameter, with a barium titanate disc of 0.0473 inch thick, an aluminum disc of 0.0394 inch thick; and an epoxy layer of 0.0133 inch for an overall thickness of 0.100 inch.

When transducer 32 in FIG. 1 is of this form and properly excited, it operates as a freely vibrating circular plate with a nodal circle at a radius of about 9/32 inch from the center. Radiation from the metal surface beyond this radius is 180 degrees out of phase with that from the surface within, and is suitably masked by the transducer housing, in practice, to prevent effective cancellation at a remote point. The transducer by itself has a narrow-band frequency-response, but is effectively given bandpass characteristics by the inductance of coil 34 connected in parallel with it and by effective circuit resistance.

Figure 4:
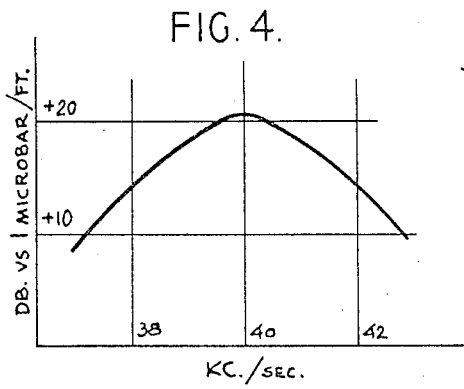
FIG. 4 is a curve representing the relative performance of the transducer at different frequencies, when connected as part of the transmitter of FIG. 1.

The frequency-response characteristic of the transducer in the circuit of FIG. 1 is illustrated in FIG. 4, the curve representing the variation in kilocycles plotted against sound pressure in decibels vs. one microbar at one foot.

The transducer is relatively directional, its output being concentrated in a 60-degree angle. Consequently, the energy of the transmitting transducer may be efficiently utilized at the remote-control point by directing it toward the receiver containing the apparatus that is to be controlled.

The transmitter is entirely self-contained when utilizing transistors and a portable battery, and for this reason each control signal may be relied upon to be a continuous ultrasonic tone, free of spurious signals.

Figure 5:
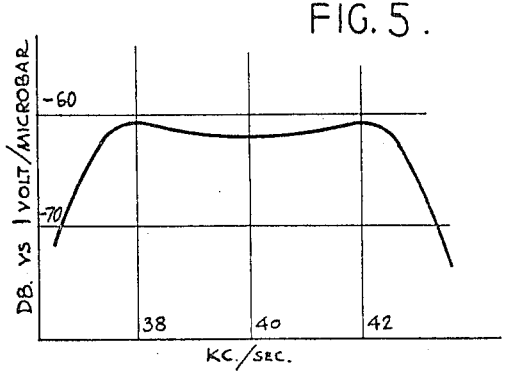
FIG. 5 is a similar curve representing relative performance of the transducer at different frequencies, when connected as a pickup element in the receiver of FIG. 6.

The receiver which completes the remote-control system complementing the transmitter of FIG. 1 is shown in FIG. 6. This receiver includes a transducer 32' which is identical to transducer 32 in FIG. 1 and in FIGS. 2 and 3; and for this reason it has the same natural resonant frequency. Moreover, by connection of a coil 44 and a resistor 46 in parallel with this transducer 32', a suitable band-pass characteristic (as shown in FIG. 5, for example) is realized. The receiver is highly directional because of the 60-degree beam-width of transducer 32'. The band-pass frequency response of FIG. 5 is attained with the transducer of FIGS. 2 and 3 using a coil of 1.6 millihenry inductance and a 100,000 ohm resistor in parallel with it.

An amplifying channel 48 has one or more pentodes 50 with single-tuned plate loads 52, for the transmitted band 38 to 42 kilocycles, with effective discrimination against frequencies outside that band. Amplifying channel 48 advantageously includes an additional duplicate amplifier including a pentode; and this output is applied to a second harmonic generator 56. A pentode amplifier 50' similar to pentode 50 forms the heart of this unit 56, but unlike the other amplifying stages 50, which have normal relatively high plate and screen applied voltages, pentode 50' is operated as a saturated amplifier with very low screen and plate voltage by virtue of a dropping resistor 58 that is interposed between the pentode and the positive high-voltage supply terminal. Resistor 58 is by-passed by condenser 60.

Pentode 50' has a grid-return resistor 62 and a shunt crystal diode 64 polarized to prevent positive excursions of signal from being impressed on the pentode control grid. The pentode operates without bias and, accordingly, is conductive at its maximum both at zero instantaneous potential and during the limited extent of positive signal excursion allowed by diode 64. As a saturated amplifier, it responds to a range of negative-going input signals. It becomes insensitive to signals beyond a certain amplitude and thus is also a limiting amplifier. By virtue of this feature, the amplifying channel has like response to signals over a wide range of different strengths.

Because of its operation as a saturated amplifier, the output of pentode 50' is rich in harmonics, prominently the second harmonic of the input ultrasonic control signals. The primaries of interstage transformers 66, 68 and 70 are connected in series as the anode load of pentode 50'. The secondaries of these interstage transformers have condensers 72, 74 and 76 for sharp-tuned resonance at the different second harmonics of the respective control frequencies involved. The control grids of thyratrons 78, 80 and 82 are connected to respective sharp-tuned secondaries. Because the connection is made at a tap as shown, there is a minimum of disturbance to the high-Q sharply selective characteristics of these tuned circuits.

If the fundamental transmitted control frequencies were utilized in these high-Q circuits, there might be instability problems in the amplifying channel, but because the second harmonic is involved in these separate output channels, the stability and band-pass characteristics of amplifying channel 48 remain effective and undisturbed even by high-level signals in the sharply resonant output circuit.

Thyratrons 78 and 80 have respective plate-load resistors 84 and 86 connected together at a junction point 88. A pair of direct-current motors 90 and 92 are arranged across the series-connected resistors 84 and 86, one or the other of these motors being so connected depending upon the position of single-pole double-throw switch 94. The grids of these thyratrons operate at the D.-C. potential of their ground return, and the cathodes of these thyratrons operate above ground potential to an extent sufficient for providing hold-off bias. These thyratrons fire only in response to large-signal input from their respective resonant input circuits. Since it may be presumed that only one or the other of the two motor-control thyratrons will fire, responding to only one control frequency transmitted, there will be a unidirectional voltage appearing across only one of the resistors 84 or 86; and this voltage will be impressed upon one of the motors 90 or 92, depending upon the position of switch 94. The polarity of the applied voltage, as developed across the load resistor 84 or 86, will control the direction of motor operation. Alternating current that is supplied to the thyratron anodes causes extinction of the fired thyratron during alternate half-cycles; and after the transmission of a control tone ceases, the thyratrons remain extinguished.

The cathodes of thyratrons 78 and 80 are both connected to alternating current supply terminal 106 through bias resistor 116 (later to be described), and junction 88 of resistors 84 and 86 extends to alternating current supply terminal 104; and the resistors are connected to the thyratrons, respectively, as load impedances. For convenience as a matter of reference, this circuit may be termed a four-armed bridge in which the thyratrons constitute one adjacent pair of arms and the resistors constitute the other pair of arms. The thyratrons act as switching devices, being either fired or non-conducting. The selected motor 92 (or 90) operates on unidirectional pulses from the alternating current line, through one of the thyratrons and one of the resistors.

The third thyratron 82 has a current limiting resistor 96 in its anode circuit, in series with a solenoid 98 which is energized when thyratron 82 is fired. Condenser 100 of large proportions shunts coil 98, and renders this coil insensitive to momentary spurious firing of the thyratron if that should occur.

A relay 102 is connected between junction 88 of the thyratron load resistors 84 and 86, and the power supply line 104. Relay 102 operates relay contacts 102a, which short-circuit coil 98 when relay 102 is energized.

With control frequencies of 38, 40 and 42 kilocycles, thyratrons 78 and 80 operate in response to the second harmonics of 38 and 42 kilocycles, respectively. If a spurious signal should get into the system, presuming it to be of a broad-band "noise" spectrum, then both thyratrons 78 and 80 would fire, and both would be equally conductive so as to develop equal and opposite voltages across resistors 84 and 86. Thus zero voltage would be impressed on the motor controlled by these thyratrons.

Thyratron 82 has its input resonant circuit tuned to the second harmonic of 40 kilocycles in the example chosen. In case of high-level broad-band noise or other spurious disturbances, the operation of the "reject" solenoid 98 would be suppressed by closing of contacts 102a. This would occur because, along with spurious firing of thyratron 82, either thyratron 78 or 80 or both would fire in response to the disturbance; relay 102 would be energized, and "reject" solenoid 98 would be short-circuited by closing of relay contacts 102a. These circuit connections provide a further enhancement of the immunization of the remote-control system to spurious signals. The motor-control circuit, when active, suppresses the "reject" circuit; and each half of the motor-control circuit suppresses the other. The system is naturally insensitive to the effects of noise and spurious electrical signals, because of the directional and frequency-selective characteristics of transducer 32' and because of the band-pass characteristics of amplifier 48 and the sharp-tuned filters for strong second harmonics of the control frequencies.

It has been mentioned that the first stage or stages of amplifying channel 48 has high applied operating voltage and a much lower level of operating voltage for developing and amplifying the second harmonic in pentode 50'. This is provided by a power supply that is energized at alternating current input terminals 106, rectified by a solid-state rectifier 108, filtered by a pi-type filter including resistor 110 and condensers 112. A voltage divider consisting of resistors 114 and 116 provide positive potential for the thyratron cathodes, as shown, so that the thyratron grids (with grounded returns) have hold-off bias applied to them. The anode supply for the thyratrons is derived directly from the alternating current line, as indicated. By virtue of this alternating current energization of the thyratrons, it is apparent that even in response to a momentary spurious signal, no thyratron would remain energized for more than one-half cycle of the normal 60-cycle alternating current supply. Large condenser 100 would suppress response of "reject" solenoid 98 to such a momentary impulse. It will also be noted that the half-cycles of alternating current developed across one of the resistors 84 and 86 represent a 180° phase difference at the motors. Consequently, while direct current motors are preferred, the substitution of phase-sensitive, reversible, alternating current motors is contemplated.

The cathodes 118 of the amplifying pentodes and the thyratrons are heated by a step-down transformer 120 energized by the same alternating current supply. It will be instantly effective to provide direct current output, the thyratron hold-off bias across resistor 116 develops instantly, whereas the thyratrons with their thermionic cathodes become operative only after a warm-up time interval. This is a further feature that provides assurance against spurious operation.

A word or two about the use of the two motors 90 and 92 may be in order. Normally a switch 94 would be set so as to place the phonograph volume control under remote control; but occasionally it may be desired to check the stereo balance of a two-speaker stereo phonograph in the application under consideration. With switch 94 positioned as shown in the drawing, the listener in checking the stero system will station himself between the two speakers, with the transmitter portion of the remote-control system in hand; and in this position the adjustment of stereo balance is efficiently executed under selective control of switch 24 and of switches 22 and 28. Switch 94 is then reversed so as to place the volume-control motor 90 under control of the remote-control system.

It is apparent that the numerous features of the foregoing remote-control system are susceptible to varied application and that a latitude of variation and modification of the novel features will occur to those skilled in the art; and therefore the invention should be construed broadly in accordance with its full spirit and scope.

What is claimed is:

1. In a remote-control system, a receiver including a direct-current reversible motor, a pair of electric power supply terminals, a pair of thyratrons connected to each other and to one of said supply terminals as two adjoining arms of a four-armed bridge, and a pair of resistors connected to each other and to the other of said supply terminals as respective loads of said thyratrons, such resistors constituting the other two arms of the bridge, said motor being connected across the resistors, a pair of frequency-selective control channels connected in control relation to said thyratrons, respectively, said motor being operative in one direction or the other selectively in response to a control signal in only one of said channels and being inoperative in response to broad-band noise providing concurrent spurious signals in both said channels, a third thyratron, a third frequency-selective control channel, and a control electromagnet, a pair of normally open contacts arranged when closed to short-circuit and thus disable the electromagnet, and a relay interposed between said other of said supply terminals and the junction of said series resistors so that, if either thyratron or both thyratrons of the four-armed bridge should be fired in response to a spurious broad-band sginal, the third thyratron would be rendered ineffective to operate the control electromagnet.

2. A remote-control system including a transmitter having a band-pass ultrasonic transducer, control-signal generating means including plural different frequency-selective devices for exciting said transducer and thereby propagating control signals, and a receiver, said receiver including a like ultrasonic transducer, a band-pass amplifying channel for said control signals coupled to said transducer, said amplifying channel including a frequency-doubling saturated amplifier, frequency-selective channels at the output of said frequency-doubling amplifier tuned to the second harmonics of said control signals, and electromechanical utilization means connected to said frequency-selective channels for selective operation under control of said transmitter.

3. In a remote-control system, a receiver including a direct-current reversible motor, a pair of alternating-current supply terminals, a pair of hot-cathode grid-controlled electron tubes connected to each other and to one of said supply terminals, and a pair of resistors connected to each other in series and their junction being connected to the other of said supply terminals, said resistors being connected to said tubes as the respective output loads thereof, a pair of different frequency-selective control channels connected in control relation to said grid-controlled tubes, respectively, and said motor being rendered operative in response to a signal in one and only one of said channels, a solid-state rectifier connected to said alternating-current supply terminals and having output connections to said tubes for supplying hold-off bias therefor, said hot-cathode tubes becoming operative only after a warm-up interval following energization of both the solid-state rectifier and the tubes so that said hold-off bias inhibits spurious operation of said motor during the warm-up interval of the tubes.

4. In a remote-control system, a receiver comprising a direct current reversible motor, a pair of alternating current electric power supply terminals, a pair of thyratrons connected to each other and to one of said supply terminals as two adjoining arms of a four-armed bridge, a pair of resistors connected to each other and to the other of said supply terminals as respective loads of said thyratrons, said resistors constituting the other two arms of the bridge, said motor being connected across said resistors, a pair of control channels operative at selected frequencies, said thyratrons having control grids connected to said control channels for receiving control bias thereon at said selected frequencies, said motor being selectively operative in one direction and the other in response to a control signal in only one of said channels and being inoperative in response to broad-band noise providing concurrent signals in both said channels.

5. In a remote-control system, a receiver comprising an ultrasonic transducer, a band pass amplifier excited by said transducer for amplifying control signals at plural selected frequencies picked up by said transducer, a harmonic generator driven by said amplifier for providing harmonics of said control signals, plural control channels each having a different sharp-tuned filter responsive to a harmonic of one of said control signals picked up by said transducer, a direct current reversible motor, a pair of alternating current electric power supply terminals, a pair of thryatrons connected to each other and to one of said supply terminals as two adjoining arms of a four-armed bridge, a pair of resistors connected to each other and to the other of said supply terminals as respective loads of said thyratrons, said resistors constituting the other two arms of the bridge, said motor being connected across said resistors, said thyratrons having control grids connected to said control channels for receiving control bias thereon at the frequencies of said control channels, said motor being selectively operative in one direction and the other in response to a control signal in only one of said channels and being inoperative in response to broad-band noise providing concurrent signals in both said channels.

6. A remote-control system comprising a transmitter having a band-pass ultrasonic transducer, control signal generating means including plural different frequency-selective devices for exciting said transducer and thereby propagating control signals, a receiver including a like ultrasonic transducer, a band-pass amplifier excited by said transducer for amplifying control signals at plural frequencies picked up by said transducer, a direct current reversible motor, a pair of alternating current electric power supply terminals, a pair of thyratrons connected to each other and to one of said supply terminals as two adjoining arms of a four-armed bridge, a pair of resistors connected to each other and to the other of said supply terminals as respective loads of said thyratrons, said resistors constituting the other two arms of the bridge, said motor being connected across said resistors, a pair of control channels connected to said band pass amplifier and operative at selected frequencies, said thyratrons having control grids connected to said control channels for receiving control bias thereon at the frequencies of said control channels, said motor being selectively operative in one direction and the other in response to a control signal in only one of said channels and being inoperative in response to broad-band noise providing concurrent signals in both said channels.

References Cited in the file of this patent

UNITED STATES PATENTS

| | | |
|---|---|---|
| 2,413,066 | Purlington | Dec. 24, 1946 |
| 2,422,068 | Bedford | June 10, 1947 |
| 2,554,329 | Hammond | May 27, 1951 |
| 2,802,977 | Harvey et al. | Aug. 13, 1957 |
| 2,817,025 | Adler | Dec. 17, 1957 |
| 2,930,955 | Bourget et al. | Mar. 29, 1960 |
| 3,075,400 | Carlson | Jan. 29, 1963 |